(12) United States Patent  
Friedman et al.

(10) Patent No.: US 9,603,499 B2  
(45) Date of Patent: Mar. 28, 2017

(54) SERVICE ROBOT AND METHOD OF OPERATING SAME

(71) Applicant: Seegrid Corporation, Pittsburgh, PA (US)

(72) Inventors: Scott Justin-Marl Friedman, Pittsburgh, PA (US); Hans Peter Moravec, Pittsburgh, PA (US)

(73) Assignee: SEEGRID CORPORATION, Pittsburgh, PA (US)

(*) Notice: Subject to any disclaimer, the term of this patent is extended or adjusted under 35 U.S.C. 154(b) by 21 days.

(21) Appl. No.: 14/487,860

(22) Filed: Sep. 16, 2014

(65) Prior Publication Data

US 2015/0006016 A1  Jan. 1, 2015

Related U.S. Application Data

(62) Division of application No. 12/361,441, filed on Jan. 28, 2009, now Pat. No. 8,838,268.

(Continued)

(51) Int. Cl.
*A47L 11/40* (2006.01)
*B25J 11/00* (2006.01)

(Continued)

(52) U.S. Cl.
CPC ........ *A47L 11/4011* (2013.01); *A47L 9/009* (2013.01); *A47L 9/281* (2013.01); *A47L 9/2805* (2013.01); *A47L 9/2852* (2013.01); *A47L 9/2894* (2013.01); *A47L 11/4061* (2013.01); *B25J 11/0085* (2013.01); *G05D 1/0214* (2013.01); *G05D 1/0227* (2013.01); *G05D 1/0274* (2013.01); *A47L 2201/04* (2013.01); *G05D 1/028* (2013.01); *G05D 1/0242* (2013.01);

(Continued)

(58) Field of Classification Search
CPC ............ A47L 11/4011; A47L 11/4061; G05D 1/0214; G05D 1/0227; B25J 11/0085
See application file for complete search history.

(56) References Cited

U.S. PATENT DOCUMENTS 4,674,048 A  6/1987  Okumura
5,032,775 A  7/1991  Mizuno et al.
(Continued)

FOREIGN PATENT DOCUMENTS

FR  WO 2006008349 A1 *  1/2006  ......... H04L 12/2697
JP  07101500  4/1995
(Continued)

OTHER PUBLICATIONS

Extended European Search Report dated Feb. 22, 2011 issued in corresponding European Application No. EP09706350.
Extended European Search Report dated Mar. 7, 2011 issued in corresponding European Application No. EP09705670.
Extended European Search Report dated Mar. 8, 2011 issued in corresponding European Application No. EP09706723.
(Continued)

*Primary Examiner* — Tuan C. To
(74) *Attorney, Agent, or Firm* — Onello & Mello, LLP

(57) ABSTRACT

In accordance with aspects of the present invention, a service robot, such as a robotic cleaner, can be configured to more effectively service an environment. The service robot can include one or more sensors that sense its location, the location of objects, or both, and can also include noise reduction elements. The service robot can determine that it is under a "furnishing" and implement a different servicing pattern.

20 Claims, 9 Drawing Sheets

Related U.S. Application Data

(60) Provisional application No. 61/024,011, filed on Jan. 28, 2008, provisional application No. 61/023,980, filed on Jan. 28, 2008, provisional application No. 61/024,001, filed on Jan. 28, 2008, provisional application No. 61/024,022, filed on Jan. 28, 2008, provisional application No. 61/024,037, filed on Jan. 28, 2008.

(51) Int. Cl.
    *G05D 1/02*      (2006.01)
    *A47L 9/00*      (2006.01)
    *A47L 9/28*      (2006.01)

(52) U.S. Cl.
    CPC ......... *G05D 1/0246* (2013.01); *G05D 1/0255* (2013.01); *G05D 1/0257* (2013.01); *G05D 2201/0203* (2013.01); *G05D 2201/0215* (2013.01)

(56) References Cited

U.S. PATENT DOCUMENTS

| | | |
|---|---|---|
| 5,086,535 A | 2/1992 | Grossmeyer et al. |
| 5,369,347 A | 11/1994 | Yoo |
| 5,440,216 A | 8/1995 | Kim |
| D364,840 S | 12/1995 | Oshizawa et al. |
| 5,534,762 A | 7/1996 | Kim |
| 5,682,313 A | 10/1997 | Edlund et al. |
| 5,684,695 A | 11/1997 | Bauer |
| D395,285 S | 6/1998 | Allon |
| 5,867,800 A | 2/1999 | Leif |
| 6,076,025 A | 6/2000 | Ueno et al. |
| 6,076,223 A | 6/2000 | Dair et al. |
| 6,076,230 A | 6/2000 | Harsh |
| 6,119,057 A | 9/2000 | Kawagoe |
| 6,124,694 A | 9/2000 | Bancroft et al. |
| 6,278,904 B1 | 8/2001 | Ishii |
| 6,339,735 B1 | 1/2002 | Peless et al. |
| 6,374,155 B1 | 4/2002 | Wallach et al. |
| 6,389,329 B1 | 5/2002 | Colens |
| 6,459,955 B1 | 10/2002 | Bartsch et al. |
| 6,496,754 B2 | 12/2002 | Song et al. |
| 6,496,755 B2 | 12/2002 | Wallach et al. |
| 6,532,404 B2 | 3/2003 | Colens |
| 6,539,284 B2 | 3/2003 | Nourbakhsh et al. |
| 6,604,022 B2 | 8/2003 | Parker et al. |
| 6,611,120 B2 | 8/2003 | Song et al. |
| 6,667,592 B2 | 12/2003 | Jacobs et al. |
| 6,690,134 B1 * | 2/2004 | Jones .................. A47L 9/009 180/167 |
| 6,728,608 B2 | 4/2004 | Ollis et al. |
| 6,732,826 B2 | 5/2004 | Song et al. |
| 6,760,647 B2 | 7/2004 | Nourbakhsh et al. |
| 6,774,596 B1 | 8/2004 | Bisset |
| 6,841,963 B2 | 1/2005 | Song et al. |
| 6,868,307 B2 | 3/2005 | Song et al. |
| 6,870,792 B2 | 3/2005 | Chiappetta |
| 6,879,878 B2 | 4/2005 | Glenn et al. |
| 6,883,201 B2 | 4/2005 | Jones et al. |
| 6,925,679 B2 | 8/2005 | Wallach et al. |
| 6,957,712 B2 | 10/2005 | Song et al. |
| 6,968,592 B2 | 11/2005 | Takeuchi et al. |
| 6,984,952 B2 | 1/2006 | Peless et al. |
| 7,024,278 B2 | 4/2006 | Chiappetta et al. |
| 7,155,308 B2 | 12/2006 | Jones |
| 7,162,056 B2 | 1/2007 | Burl et al. |
| 7,167,775 B2 | 1/2007 | Abramson et al. |
| 7,188,000 B2 | 3/2007 | Chiappetta et al. |
| 7,206,677 B2 | 4/2007 | Hulden |
| D541,798 S | 5/2007 | Ichida et al. |
| 7,251,548 B2 | 7/2007 | Herz et al. |
| 7,446,766 B2 | 11/2008 | Moravec |
| 7,447,593 B2 | 11/2008 | Estkowski et al. |
| 7,526,362 B2 | 4/2009 | Kim et al. |
| D602,931 S | 10/2009 | Kaner et al. |
| D613,341 S | 4/2010 | Mar et al. |
| 7,720,572 B2 | 5/2010 | Ziegler et al. |
| 7,805,220 B2 | 9/2010 | Taylor et al. |
| 7,835,821 B2 | 11/2010 | Roh et al. |
| 8,584,305 B2 * | 11/2013 | Won .................. A47L 5/30 15/319 |
| D697,198 S | 1/2014 | Amirouche et al. |
| 2001/0047231 A1 | 11/2001 | Peless et al. |
| 2002/0016649 A1 | 2/2002 | Jones |
| 2002/0095239 A1 * | 7/2002 | Wallach .............. G05D 1/0295 700/245 |
| 2002/0120364 A1 | 8/2002 | Colens |
| 2002/0138936 A1 | 10/2002 | Takeuchi et al. |
| 2003/0025472 A1 | 2/2003 | Jones et al. |
| 2003/0028286 A1 | 2/2003 | Glenn et al. |
| 2003/0120389 A1 * | 6/2003 | Abramson ................ A47L 5/22 700/245 |
| 2003/0212472 A1 | 11/2003 | McKee |
| 2004/0030571 A1 | 2/2004 | Solomon |
| 2004/0073337 A1 | 4/2004 | McKee et al. |
| 2004/0076324 A1 | 4/2004 | Burl et al. |
| 2004/0167716 A1 | 8/2004 | Goncalves et al. |
| 2004/0168148 A1 | 8/2004 | Goncalves et al. |
| 2004/0187249 A1 * | 9/2004 | Jones ..................... A47L 5/30 15/319 |
| 2004/0204792 A1 | 10/2004 | Taylor et al. |
| 2004/0207355 A1 | 10/2004 | Jones et al. |
| 2005/0000543 A1 | 1/2005 | Taylor et al. |
| 2005/0065662 A1 * | 3/2005 | Reindle ................ A47L 9/2821 701/1 |
| 2005/0067994 A1 | 3/2005 | Jones et al. |
| 2005/0080514 A1 | 4/2005 | Omote et al. |
| 2005/0134209 A1 | 6/2005 | Kim |
| 2005/0171644 A1 * | 8/2005 | Tani .................. A47L 9/009 700/253 |
| 2005/0216126 A1 | 9/2005 | Koselka et al. |
| 2005/0251292 A1 * | 11/2005 | Casey ................ G05D 1/0238 700/245 |
| 2005/0273226 A1 | 12/2005 | Tani |
| 2005/0273967 A1 | 12/2005 | Taylor et al. |
| 2005/0287038 A1 | 12/2005 | Dubrovsky et al. |
| 2005/0288079 A1 | 12/2005 | Tani |
| 2006/0020369 A1 | 1/2006 | Taylor et al. |
| 2006/0038521 A1 | 2/2006 | Jones et al. |
| 2006/0060216 A1 | 3/2006 | Woo |
| 2006/0061476 A1 | 3/2006 | Patil et al. |
| 2006/0095158 A1 | 5/2006 | Lee et al. |
| 2006/0167622 A1 * | 7/2006 | Bodin .................... G05D 1/104 701/467 |
| 2006/0178777 A1 | 8/2006 | Park et al. |
| 2006/0200282 A1 * | 9/2006 | Lee ..................... G05D 1/0221 701/23 |
| 2006/0293788 A1 | 12/2006 | Pogodin |
| 2007/0042716 A1 | 2/2007 | Goodall et al. |
| 2007/0135962 A1 | 6/2007 | Kawabe et al. |
| 2007/0192910 A1 | 8/2007 | Vu et al. |
| 2007/0199108 A1 | 8/2007 | Angle et al. |
| 2007/0244610 A1 | 10/2007 | Ozick et al. |
| 2008/0004904 A1 | 1/2008 | Tran |
| 2008/0056933 A1 | 3/2008 | Moore et al. |
| 2008/0086236 A1 | 4/2008 | Saito et al. |
| 2008/0091304 A1 * | 4/2008 | Ozick ..................... A47L 5/30 700/258 |
| 2008/0109114 A1 | 5/2008 | Orita et al. |
| 2008/0184518 A1 * | 8/2008 | Taylor ................... A47L 9/009 15/319 |
| 2008/0249661 A1 * | 10/2008 | Hong ................... A47L 9/009 700/252 |
| 2008/0300720 A1 * | 12/2008 | Kim ..................... A47L 9/009 700/245 |

(56) References Cited

U.S. PATENT DOCUMENTS

| | | | | |
|---|---|---|---|---|
| 2009/0048727 A1* | 2/2009 | Hong | ................... | G05D 1/0238 701/26 |
| 2010/0234998 A1* | 9/2010 | Kim | ..................... | A47L 9/2805 700/259 |

FOREIGN PATENT DOCUMENTS

| | | | | |
|---|---|---|---|---|
| JP | 11-104984 | A | 4/1999 | |
| JP | 2002-254374 | A | 9/2002 | |
| JP | 2003006532 | | 1/2003 | |
| JP | 2003-515210 | A | 4/2003 | |
| JP | 2003-180587 | | 7/2003 | |
| JP | 2003241833 | | 8/2003 | |
| JP | 2003-256043 | | 9/2003 | |
| JP | 2004-97439 | | 4/2004 | |
| JP | 2004-097439 | A | 4/2004 | |
| JP | 2004148089 | | 5/2004 | |
| JP | WO 2004081683 | A1 * | 9/2004 | ........... G05D 1/0246 |
| JP | 2005-111603 | A | 4/2005 | |
| JP | 2005-205028 | | 8/2005 | |
| JP | 2006-007368 | A | 1/2006 | |
| JP | 2006-087918 | A | 4/2006 | |
| JP | 2006-102861 | A | 4/2006 | |
| JP | 2006-331054 | | 12/2006 | |
| KR | 10-2002-0076153 | A | 10/2002 | |
| KR | 10-2002-0081035 | A | 10/2002 | |
| KR | 10-2002-0088880 | A | 11/2002 | |
| KR | 10-0645881 | B1 | 11/2006 | |
| WO | 01/37060 | | 5/2001 | |
| WO | 01/38945 | | 5/2001 | |
| WO | 0137060 | A1 | 5/2001 | |
| WO | 2007/051972 | | 5/2007 | |

OTHER PUBLICATIONS

Office Action in U.S. Appl. No. 29/471,328, dated Jun. 4, 2014.
Office Action in Chinese Patent Application No. 200980108309.X, dated Jun. 4, 2014.
Flexible & integrated unmanned command & control [online]. Howard, Courtney, 2013 [retrieved on May 29, 2014]. Retrieved from the Internet: <URL: http://www.militaryaerospace.com/articles/print/volume-24/issue-11/special-report/flexible-integrated-unmanned-command-control.html>.
International Search Report dated Aug. 31, 2009 issued in corresponding International Application No. PCT/US2009/032274.
International Search Report dated Sep. 14, 2009 issued in corresponding International Application No. PCT/US2009/032243.
International Search Report dated Sep. 14, 2009 issued in corresponding International Application No. PCT/US2009/032245.
International Search Report dated Sep. 30, 2009 issued in corresponding International Application No. PCT/US2009/034081.
Bennewitz, et al., "Adapting Navigation Strategies Using Motions Patterns of People", 2003, Proceedings of the 2003 IEEE International Conference on Robotics & Automation, pp. 2000-2005.
Alami, et al., "Diligent: Towards a Human-Friendly Navigation System", 2000, Proceedings of the 2000 IEEE/RSJ International Conference on Intelligent Robots and Systems, pp. 21-26.
Lee, et al., "An Agent for Intelligent Spaces: Functions and Roles of Mobile Robots in Sensored, Networked and Thinking Spaces", 1997, IEEE Conference on Intelligent Transportation System (ITSC '97), pp. 983-988.
Final Office Action dated Nov. 5, 2013 issued in corresponding Japanese Application No. 2010-545107.
Extended European Search Report dated Sep. 12, 2013 issued in corresponding European Application No. 09710577.9.

* cited by examiner

SERVICE ROBOT AND METHOD OF OPERATING SAME

CROSS-REFERENCES TO RELATED APPLICATION

This application is a divisional application of U.S. patent application Ser. No. 12/361,441 filed Jan. 28, 2009, which claims the benefit of priority under 35 U.S.C. §119(e) from provisional application Ser. No. 61/024,011, entitled "METHODS FOR OBJECT, SURFACE, AND FUNCTION-SPECIFIC CLEANING FOR ROBOT CLEANERS," filed on Jan. 28, 2008; from provisional application Ser. No. 61/023,980, entitled "METHOD FOR CLEANING UNDERNEATH FURNISHINGS FOR ROBOTIC CLEANER," filed on Jan. 28, 2008; from provisional application Ser. No. 61/024,001, entitled "METHODS FOR IMPROVING ROBOTIC CLEANING VIA GLOBAL LOCATION AWARENESS," filed on Jan. 28, 2008; from provisional application Ser. No. 61/024,022, entitled "METHODS AND APPARATUSES FOR NOISE REDUCTION FOR ROBOTIC CLEANERS," filed Jan. 28, 2008; from provisional application Ser. No. 61/024,037, entitled "METHODS FOR ENVIRONMENTAL SCHEDULE AWARENESS FOR ROBOTS THAT SERVICE A FACILITY," filed on Jan. 28, 2008, each of which is incorporated herein by reference in its entirety.

FIELD OF INTEREST

The present inventive concepts relate to methods for effectiveness and efficiency of robotic cleaners.

BACKGROUND

One of the advantages of robotic cleaners is that they can clean in places that are hard or impossible to clean manually. Many types of furnishings found in houses and commercial and industrial buildings provide a small amount of clearance under the furnishing. Examples include shelves, couches, and beds. These clearance spaces are often too small to clean easily manually, yet they are large enough to accumulate dirt and dust.

Previous attempts at providing robotic cleaners that can clean under furnishing have been limited in their flexibility, and also in their success. Most current commercial systems employ a "cleaning algorithms" technique. In this type of system, the cleaner moves in a single or a series of random or semi-random patterns around the floor. The pattern(s) are varied as too time, or other calculations the robot cleaner performs. However, in all cases, the goal of the cleaner is to optimize the cleaning of a larger space that happens to include the space under the furnishings.

These systems also have a design, such that the robot is able to fit into the very small under furnishing spaces, as well as passably clean the more open spaces of a building. The design compromises required to create a robotic cleaner that can both fit into the very small spaces under furnishings and also clean the open expanses of a building are daunting. Therefore, the efficiency and effectiveness of such systems is poor. For this reason, many systems have given up on this challenge entirely.

Efficiency and effectiveness of robot cleaners is typically low because the robots do not use techniques that make use of global location awareness. That is, they are generally unaware of their actual location. Previous service cleaning robots have ignored this problem, resulting in sub-optimal cleaning. Without a location context, the servicing robots are limited in terms of providing a series of tasks within an overall location, for example.

Moreover, current robot cleaners do not use what they learn as they do their job to improve their work. As an example, current robot cleaners will always clean when scheduled even when there is too much activity in the area to be able to clean at the scheduled time, resulting in a cleaning failure each time.

Also, that very action of servicing (e.g., cleaning) an environment or facility is a complex activity that can require a large fund of knowledge to perform adequately. Previous cleaning robots, as an example, have ignored this fund of knowledge problem. Instead, they tend to rely on generalized techniques to clean all different surfaces, objects, or functional areas of a facility.

Additionally, some service robots, such as robotic vacuums, can produce a relatively large amount of noise. Previous attempts at reducing noise in robotic cleaners have relied on traditional techniques that have been used to quiet manual vacuum cleaners. These include, but are not limited to: covering the working mechanisms with hard plastic shells, carefully designing moving parts to reduce noise production, and artificially limiting the strength of the cleaning mechanism to reduce the maximum noise levels products.

SUMMARY OF INVENTION

In accordance with one aspect of the invention, provided is a method of performing robotic cleaning. The method includes: navigating a cleaning robot through an environment using automatic self-control by the robot; sensing furnishings in the environment by the robot while navigating and cleaning; and avoiding contact with the furnishings based on sensor data acquired during the sensing.

The navigating can include the robot optimizing its migration through the environment based on the sensor data.

The optimizing can include changing a navigation pattern of the cleaning robot from a first pattern to a second pattern.

The sensing can include determining if the robot can fit underneath a furnishing, and the navigating can include migrating under the furnishing when the sensing determines that the robot can fit underneath the furnishing.

The sensing can further include using light sensing, including differentiating lower light intensity levels under the furnishing from higher light intensity levels in open spaces.

The sensing can further include upward facing height sensing, including differentiating a shorter un-occluded distance in an upward direction near the furnishing from a longer un-occluded distance in open spaces.

The sensing can further include using one or more of differentiating acoustic or electromagnetic qualities of under furnishing spaces from acoustic or electromagnetic qualities of open spaces.

The sensing can further include determining where open spaces are when robotic cleaner is underneath an object.

The robotic cleaner can be a robotic vacuum cleaner.

In accordance with another aspect of the invention, provided is a robotic cleaner configured to determine when it is under a furnishing. The robotic cleaner includes: a platform supporting a cleaning subsystem; a navigation controller coupled to a drive mechanism and configured to navigate the platform through an environment; and one or more sensors configured to sense objects in the environment during navigation and cleaning; wherein the navigation controller controls the drive mechanism to avoid contact with the objects based on sensor data acquired by the one or more sensors.

The robotic cleaner can have a height of six inches or less, and be optimized to fit under furnishings.

The navigation controller can be configured to optimize its migration through the environment based on the sensor data.

The navigation controller can be configured to optimize the migration of the cleaning robot by changing a navigation pattern of the cleaning robot from a first pattern to a second pattern.

The one or more sensors can be configured to determine if the cleaning robot can fit underneath an object, and the navigation controller can be configured to enable migration under the object when the one or more sensors determine that the robot can fit underneath the object.

The one or more sensors can include light sensors configured to differentiate lower light intensity levels under the object from higher light intensity levels in open spaces.

The one or more sensors can include upward facing height sensors configured to differentiate a shorter un-occluded distance in an upward direction near an object from a longer un-occluded distance in open spaces.

The one or more sensors can include one or more of acoustic and electromagnetic sensors configured to differentiate acoustic or electromagnetic qualities of under object spaces from acoustic or electromagnetic qualities of open spaces.

The one or more sensors can be configured to enable to the robotic cleaner to determine where open spaces are when robotic cleaner is underneath an object.

The robot cleaner can be a robotic vacuum cleaner.

In accordance with another aspect of the invention, provided is a method of performing robotic servicing using global location awareness. The method includes: storing in memory identifications of a plurality of locations within an environment; servicing the locations with a robot; and tracking a frequency of service of each location by the robot.

The method can further include the robot ning servicing routes to optimally service all locations.

The method can further include servicing high-use locations with greater frequency than lower-use locations.

The service robot can be a robotic cleaner.

The robotic cleaner can be a robotic vacuum.

The method can further include tracking dirt levels at each location and varying cleaning activity to clean high dirt level locations with increased frequency.

The method can further comprise: assigning functional labels to each location; and associating locations with specific events for times of the day, after which cleaning should be performed in those locations.

In accordance with another aspect of the invention, provided is a service robot configured to utilize global location information. The service robot includes: a platform supporting a service subsystem; a navigation controller coupled to a drive mechanism and configured to navigate the platform through an environment; and a data storage system that stores identifications of a plurality of locations within the environment; a navigation controller configured to track a frequency of service of each location by the robot.

The navigation controller can be further configured to tailor servicing routes to enable the robotic cleaner to optimally service all locations.

The service robot can be a robotic cleaner.

The robot can further comprise one or more sensors configured to sense levels of dirt.

The navigation controller can be further configured to track dirt levels at each location and vary cleaning activity to clean high dirt level locations with increased frequency.

The navigation controller can be further configured to: assign functional labels to each location; and associate locations with specific events for times of the day, after which cleaning should be performed in those locations.

In accordance with aspects of the invention, provided is a robotic cleaner and method that allows superior reduction in the noise of robotic cleaners.

The robotic vacuum cleaner can include layers of sound dampening materials that are incorporated into the robot.

The robotic cleaner can be a robotic vacuum cleaner.

The robotic cleaner can include placement of microphones, speakers, and electronic computation and circuitry to provide for active noise reduction of the sounds of the robotic cleaner.

The robotic cleaner can include acoustic muffling chambers that are incorporated into the robot.

In accordance with aspects of the present invention, provided are a robot and methods that enable the robot to service a facility optimally by making use of an environmental schedule of the facility.

The robot can be configured to automatically and selectively operate in view of an environmental schedule of a facility, and to make the schedule.

The robot can be configured to perform a people census, whereby through the robot's own sensing, or through receiving such information from an external source, the robot learns where people are likely, and unlikely to be at various times of the day, and uses a statistical model of likelihood to work as much as possible when and where people are not present.

The robot can be configured to perform a people census, whereby real-time data is used to trigger or queue the robot to begin or end work. For instance, a sensor recording when the car leaves the garage or when people leave a room, can be used to trigger the robot to begin work.

The robot can be configured to analyze a digitized calendar of appointments of people, and to form a plan to work when people are scheduled to not be present according to the calendar.

The robot can be configured to predicatively calculate the likelihood of a person returning at any given time, so that the robot can stop working before the person arrives.

In accordance with aspects of the present invention, provided is a robot and method that allows a robot to clean a facility by providing access to cleaning knowledge that is specific to the surface or object being cleaned, or to the area of the facility being cleaned. Methods in accordance therewith can enable the robot to optimally service a facility.

A knowledgebase can be included in the robot, whereby when the robot senses a specific type of object, surface, or area to be cleaned, the robot queries an internal knowledgebase for specific cleaning techniques for cleaning the object or surface.

The knowledgebase can be a knowledgebase of techniques identified as able to work well for cleaning such object, surface or area.

A library of learned behaviors can be included in the robot, whereby when the robot senses a specific type of object, surface, or area to be cleaned, the robot queries an internal library of learned behaviors for specific cleaning techniques for cleaning the object or surface.

The library can be a library of behaviors that have worked well in the past for cleaning such object, surface or area.

A remote knowledgebase can be provided, whereby when the robot senses a specific type of object, surface, or area to be cleaned it queries a remote knowledgebase or bases for specific cleaning techniques for cleaning the object or surface to be cleaned.

The remote knowledge base could be created and/or provided by trusted sources, such as the manufacturers of the artifacts to be cleaned.

A remote library of learned behaviors could be provided, whereby when the robot senses a specific type of object, surface, or area to be cleaned it queries an remote library of learned behaviors for specific cleaning techniques for cleaning the object or surface to be cleaned.

The remote library can be a library to behaviors that have worked well in the past for cleaning such object, surface or area.

BRIEF DESCRIPTION OF THE DRAWINGS

The present invention will become more apparent in view of the attached drawings and accompanying detailed description. The embodiments depicted therein are provided by way of example, not by way of limitation, wherein like reference numerals refer to the same or similar elements. The drawings are not necessarily to scale, emphasis instead being placed upon illustrating aspects of the invention. In the drawings.

DETAILED DESCRIPTION OF PREFERRED EMBODIMENT

Hereinafter, aspects of the present invention will be described by explaining illustrative embodiments in accordance therewith, with reference to the attached drawings. While describing these embodiments, detailed descriptions of well-known items, functions, or configurations are typically omitted for conciseness.

It will be understood that, although the terms first, second, etc. are be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements can be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

Spatially relative terms, such as "beneath," "below," "lower," "above," "upper" and the like may be used to describe an element and/or feature's relationship to another element(s) and/or feature(s) as, for example, illustrated in the figures. It will be understood that the spatially relative terms are intended to encompass different orientations of the device in use and/or operation in addition to the orientation depicted in the figures. For example, if the device in the figures is turned over, elements described as "below" and/or "beneath" other elements or features would then be oriented "above" the other elements or features. The device may be otherwise oriented (e.g., rotated 90 degrees or at other orientations) and the spatially relative descriptors used herein interpreted accordingly.

Figure 1:
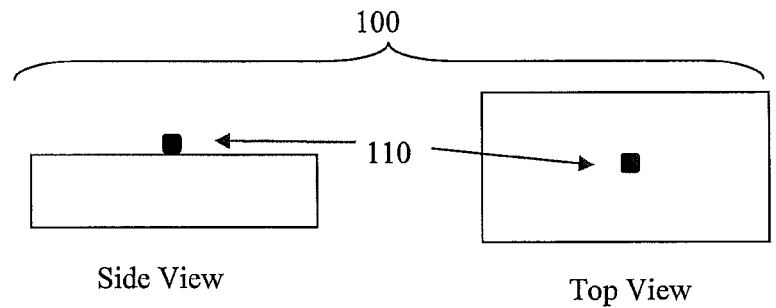
FIG. 1 shows an embodiment of a service robot including top mounted sensor, in accordance with aspects of the present invention.

FIG. 1 shows an embodiment of a service robot 100 that can be used to service an environment, e.g., a facility. In this embodiment, the service robot can include an upward facing sensor 110, shown in a top surface of the service robot 100. The sensor 110 can be used to determine whether the robotic cleaner 300 is under a furnishing or in an open space, as examples. Upward facing sensor can be any one or more of a variety of types of sensors, e.g., such as a photosensor, an acoustic sensor, and infrared sensor. As an example, a properly configured photosensor can be configured to detect light intensity differences between open spaces and covered spaces—such as under a furnishing. In such a case, detection of a significant drop in light intensity could indicate that the service robot had moved under a furnishing. Conversely, an increase in light intensity could indicate that the service robot moved out from underneath a furnishing.

Figure 2:
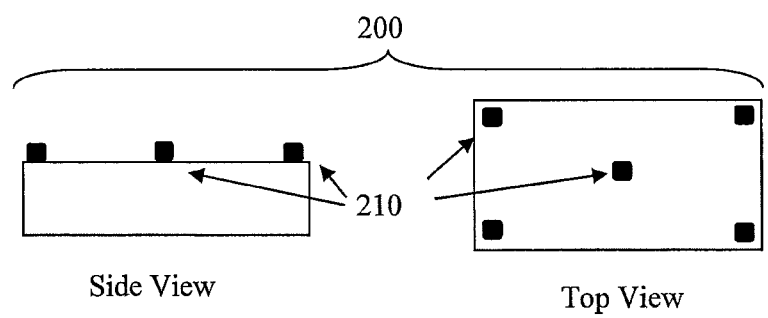
FIG. 2 shows an embodiment of a service robot including multiple sensors, in accordance with aspects of the present invention.

FIG. 2 shows an embodiment of a service robot cleaner 200 with multiple sensors 210. Such multiple 210 sensors could be used to allow the service robot 200 to determine a direction of its movement. For example, assuming photosensors, if the robotic cleaner is moving under a furnishing, the first detector(s) that are under the furnishing will detect less light than those still in the open space—at that point in time. Then the next detector under the furnishing will detect less light and so on. That data enables determination of the direction of the robotic cleaner relative to the furnishing and open space. A similar analysis can be performed when moving from underneath the furnishing into the open space.

Figure 3A:
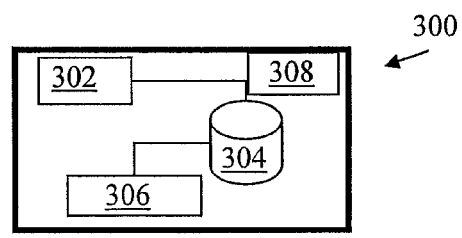
FIG. 3A shows a block diagram of an embodiment of a service robot, in accordance with aspects of the present invention.

FIG. 3A shows a block diagram of an embodiment of a service robot 300, such as those described in FIGS. 1 and 2 above. As an example, the service robot 300 could be a wireless robotic vacuum. The service robot 300 can be configured to implement the various methods described herein below. In some embodiments, one or more external sensors could be located within the environment, in addition to or as an alternative to, sensors mounted on the robot. In such a case the service robot could interact with the external sensors or a system that communicates with the external sensors, e.g., over a wireless network.

In this embodiment, the service robot 300 includes a platform supporting a servicing subsystem 306 and a navigation controller 302 coupled to a drive mechanism (not shown) and configured to navigate the platform through an environment. The service robot also includes one or more sensors (as shown in FIGS. 1 and 2). Sensor data acquired from the sensor(s) can be stored in a storage media 304, e.g., a hard drive, random access memory, read only memory, or some combination thereof. Other data and program modules can also be stored in storage media 304. The program modules can be executable by at least one processor to implement methods, or portions thereof, described herein. Functional modules need not be implemented in executable program code, however. One or more functional modules could, additionally or alternatively, be implemented in hardware, firmware, or both, as examples.

The storage media 304 can also include maps of the environment, or other information useful or necessary for migrating the service robot through the environment. In various embodiments, the service robot could also build, update, or both maps of the environment. Such map building and navigation could be done as described in U.S. Pat. No. 7,446,766 entitled "Multidimensional Grids and Systems and Methods for Applying Same," and/or U.S. patent application Ser. No. 12/263,983 filed Nov. 3, 2008, entitled "Multidimensional Grids and Systems and Methods for Applying Same." The storage media 304 can, in various embodiments, be used to store robot location information determined using the sensor data.

In various embodiments the navigation controller 302 can be configured to control the drive mechanism to avoid contact with furnishing (e.g., object) in the environment based on sensor data acquired by the one or more sensors.

In various embodiments, the service robot can also include a communications module 308, which could enable wired or wireless communications with a control system, other robots, or other wireless devices (e.g., personal digital assistant, cell phone, wireless laptop, etc.).

In various embodiments, e.g., where the service robot is a robotic cleaner, the servicing subsystem 306 can include a dirt detector. The dirt detector can be used to track the amount of dirt taken in at a location. This information could be stored and used to determine a schedule of cleaning for various places within the environment.

Figure 3B:
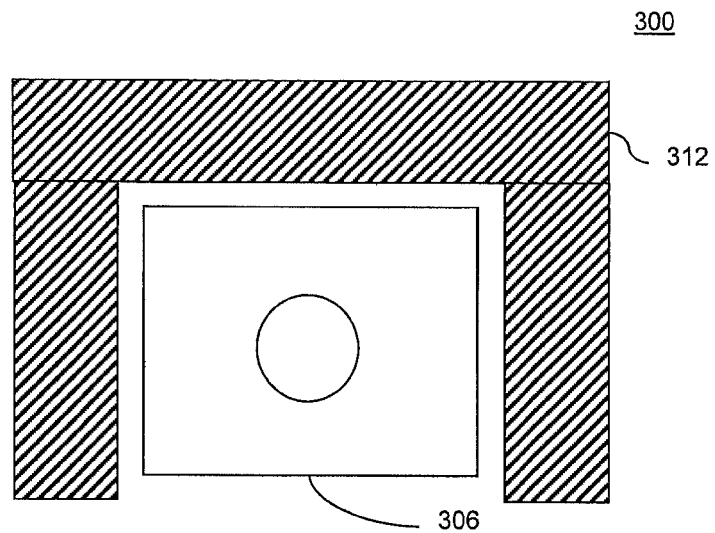
FIG. 3B is a cross section of an embodiment of a robotic cleaner with passive acoustic dampening.
Figure 3C:
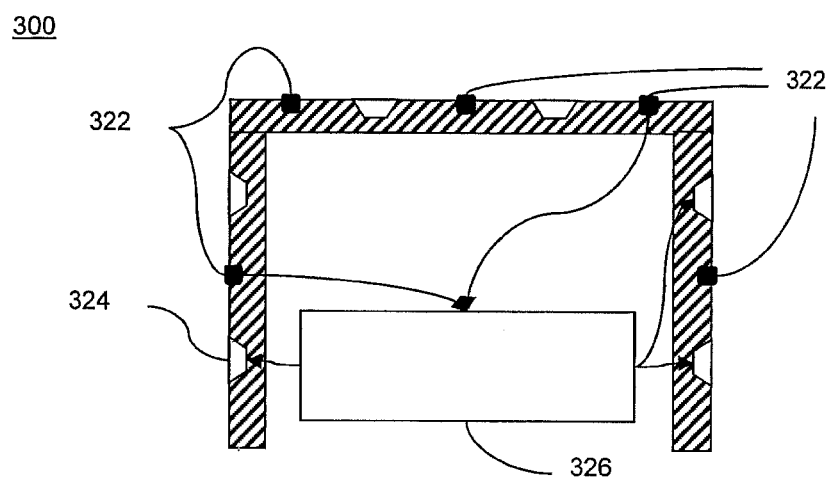
FIG. 3C is a cross section of an embodiment of a robotic cleaner with active acoustic dampening.
Figure 3D:
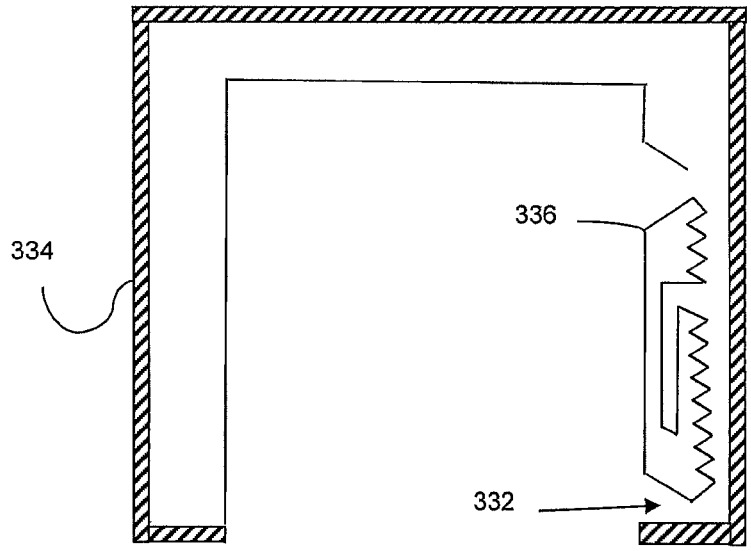
FIG. 3D is a cross section of an embodiment of a robotic cleaner with an acoustic muffling chamber.

In various embodiments the service robot can include one or more types of acoustic damping mechanism, as discussed in the examples of FIGS. 3B-3D.

FIG. 3B is a cross section of an embodiment of service robot 300 with passive acoustic damping, such as a robotic cleaner. In FIG. 3B the robot and cleaning mechanisms are shown as block 312. These can be as known in the art, or as hereafter developed. A passive acoustic damping material is provided to substantially encase or cover the servicing subsystem 306, e.g., a cleaning mechanism. In this embodiment, the bottom portion of the service robot is not covered by the passive acoustic damping material, allowing for exposure of translation mechanisms disposed there. However, in other embodiments, passive acoustic damping material could also be included on the bottom portion.

In various embodiments, passive acoustic damping materials can include typical materials suited for such purposes, such as various types and configurations of foam.

FIG. 3C is a cross section of an embodiment of service robot 300 with active acoustic dampening. In this embodiment, the active acoustic dampening includes a set of microphones 322, a set of speakers 324, and acoustic cancelling functionality 326. The acoustic cancelling functionality receives inputs from the microphones 322 and outputs noise cancelling tones via speakers 324.

FIG. 3D is a cross section of an embodiment of service robot 300 with an acoustic muffling chamber 332 formed therein. In this embodiment, the muffling chamber 332 is formed around the servicing subsystem (not shown) disposed therein, which muffles the noise therefrom. The muffling chamber 332 is formed between an outer shell 334 and internal insulation material 336. The internal insulation material is preferably contoured to enhance noise muffling properties.

In accordance with aspects of the present invention, service robot 300 can be a robotic cleaner configured to implement a method of more effectively cleaning a space that includes furnishings, for example. The cleaner and method can determine that the cleaner is under a "furnishing" and implement a different cleaning pattern as a function thereof. The determination that the robotic cleaner is under a furnishing can be accomplished using any one or more of a plurality of types of sensors mounted on, integral with, or coupled to the robotic cleaner.

Figure 4:
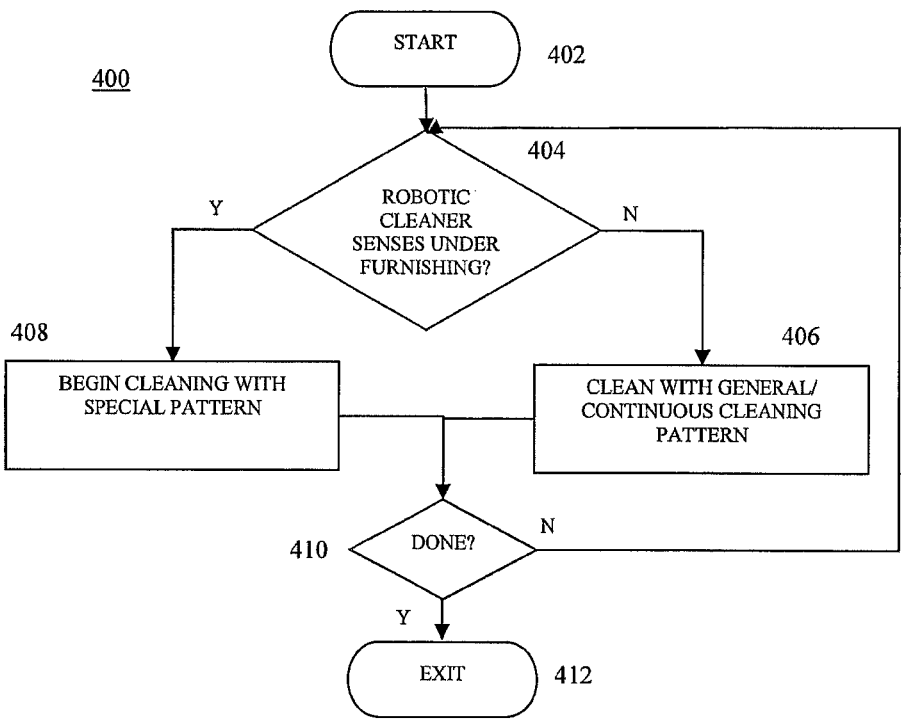
FIG. 4 is a flowchart that illustrates an embodiment of a method for servicing an environment by a service robot, according to aspects of the present invention.

FIG. 4 is a flowchart 400 that illustrates an embodiment of a method for a service robot (e.g., a robotic vacuum cleaner) according to aspects of the present invention. The service robot can be configured to sense objects in the environment during navigation and servicing.

In this embodiment, for illustrative purposes, it is presumed that the service robot is a robotic cleaner. In step 402 the robotic cleaner begins cleaning. In step 404 the robotic cleaner determines whether it is under a "furnishing." As used herein, the word "furnishing" can mean any physical item or object located in a space (or environment) being cleaned. It need not be limited to furniture, for example.

In the present embodiment the robotic cleaner presumes that it is not under a furnishing unless it senses, or otherwise determines, that it is under a furnishing. If in step 404 the robotic cleaner determined that it was not under a furnishing, the robotic cleaner continues to clean the space using a general cleaning pattern, in step 406. This general cleaning pattern can be any of those used in currently available robotic cleaners.

However, if in step 404 the robotic cleaner determined that it was under a furnishing, the process would continue to step 408, where the robotic cleaner would begin cleaning with a special pattern. The special pattern would be tailored for better cleaning under a furnishing. For example, the special cleaning pattern can be tighter, since it is designed to be effective in a smaller footprint. In the preferred embodiment, when the robotic cleaner senses that it is moving out from underneath the furnishing, it turns back the other way so that it stays underneath the furnishing until cleaning is complete.

Ultimately, the process can move to step 410 where a determination can be made of whether or not the robotic cleaner is done cleaning the space. If not, the process can revert to step 402. If so, the cleaner can exit the cleaning activity in step 412.

It will be understood by those skilled in the art, that the monitoring for whether the robotic cleaner is under a furnishing can be substantially constant, since the sensors can be in a sensing mode throughout the use of the robotic cleaner, periodic, or otherwise intermittent. Thus, in some embodiment, the sensed condition of moving under a furnishing can serve as an interrupt to the mode of the general, open space cleaning. The interrupt can cause the robotic cleaner to begin cleaning with the special pattern.

Figure 5:
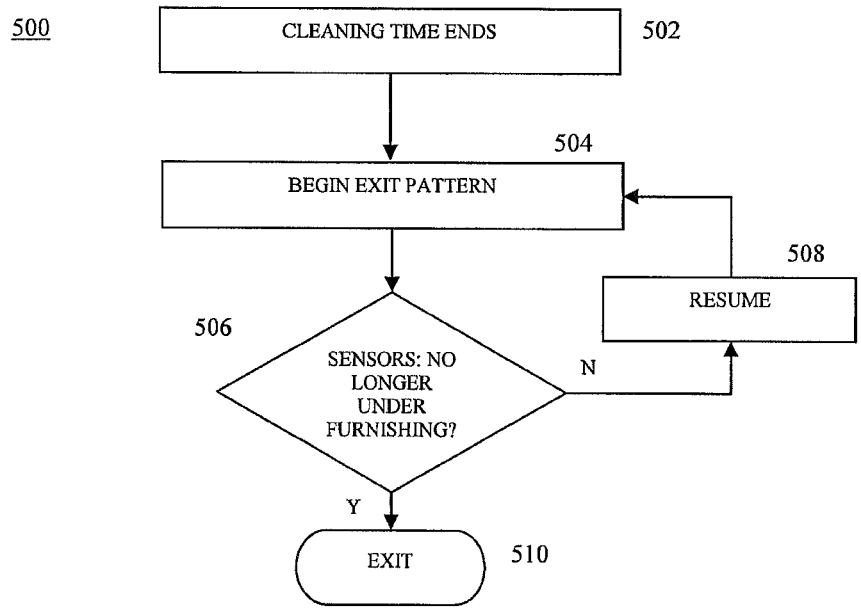
FIG. 5 is a flowchart that illustrates an embodiment of a method for ending a servicing activity of a service robot, in accordance with aspects of the present invention.

FIG. 5 is a flowchart 500 that illustrates an embodiment of a method for ending the above cleaning activity underneath a furnishing. In various embodiments, a timer can be used to measure the time that the robotic cleaner is in the special cleaning pattern. In step 502, when a predetermined time has elapsed the robotic cleaner can begin transitioning to an exit pattern in step 504. However, before completing the exit pattern, in step 506 the robotic cleaner can determine whether the robotic cleaner is still no longer under the furnishing. If the answer is "no," the robotic cleaner resumes, in step 208, the exit pattern in step 504. If the answer is "yes," the robotic cleaner ends the exit pattern in step 510.

In other embodiments, the determination method may be based on upward facing height sensing, as the un-occluded distance in the upward direction is much shorter than in open spaces. In still other embodiments, the determination may be based on other perceptual techniques such as acoustics, or electromagnetic qualities of such under furnishing environments. In still other embodiments, the determination method may be based on a combination thereof.

In various embodiments, a robotic cleaner, such as those in FIGS. 1, 2 and 3, can be a low profile robotic cleaner. For example, the robotic cleaner can be less than 6 inches in height, and preferably about 2 inches or less in height.

Figure 6:
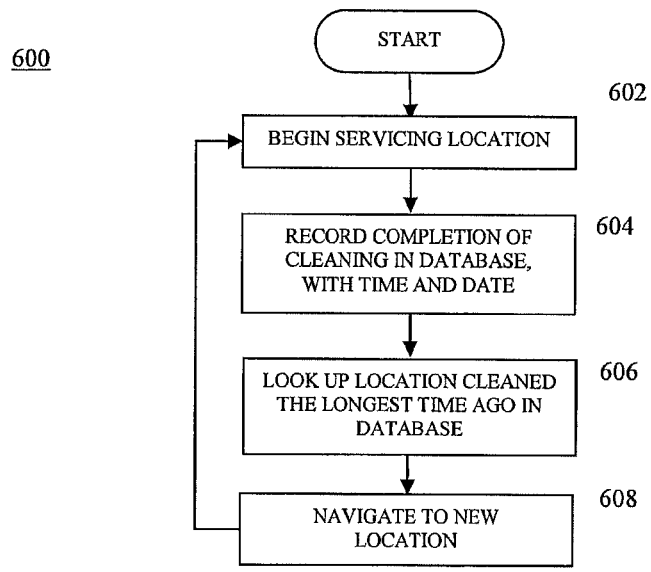
FIGS. 6 and 7 are flowcharts illustrating embodiments of a location awareness method used by a service robot, in accordance with aspects of the present invention.

FIG. 6 is a flowchart 600 of an embodiment of a method for controlling a service robot with location awareness. In this embodiment the service robot is a cleaning robot, such as a robotic vacuum.

In step 602 the robot is in the process of servicing (e.g., cleaning) a location (or area), e.g., a room. In step 604 the robot records completion of the cleaning and the location in a database. In step 606 the robot searches the database to determine the next location to clean. In this embodiment there is a presumption that the location for which the longest time has elapsed since the last cleaning should be the next location cleaned. In step 608, the robot navigates to the next location to be cleaned.

Note that in some embodiments the robot can include the database. However, in other embodiments the robot could communicate over a wireless network with a database system within which such information can be stored.

Figure 7:
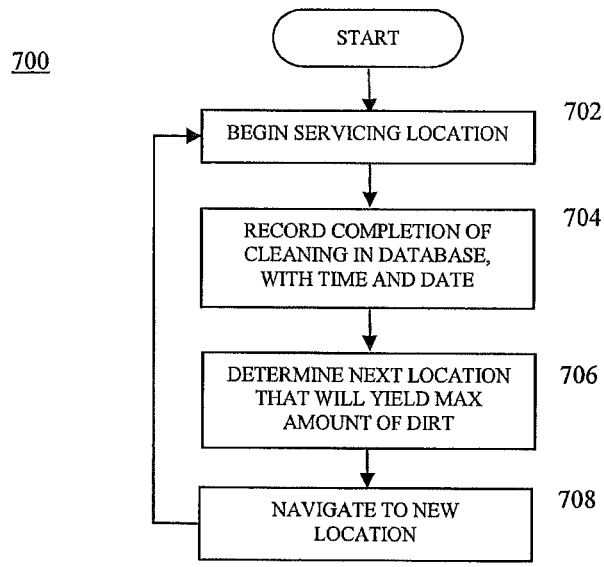

FIG. 7 is a flowchart 700 of another embodiment of a method for controlling a service robot with location awareness and dirt level awareness. In this method the robot not only includes sensors and related mechanisms to determine its location within a facility, but also includes one or more sensors to record a level of dirt associated with each location, as discussed above. The dirt level can be used as a parameter in determining the frequency of cleaning of different locations within the facility. High dirt level locations can be cleaned more frequently than low dirt level locations.

In step 702 the robot is cleaning in a location. In step 704 the robot records completion of the cleaning, including associating the date and time of cleaning in the database with location. The robot also senses and records the amount of dirt taken in when cleaning the location. In step 706 an algorithm is run to determine the next location to be cleaned. The algorithm takes into account the last time the location was cleaned and the dirt level associated with that location. In step 708 the robot navigates to a new location, to begin cleaning that location.

In other embodiments, the robot need not be configured with dirt sensors. However, the robot could be preprogrammed with to clean certain locations with higher frequency than other locations. For example, in an office building the highest traffic locations could be cleaned more frequently than other locations, or public locations could be cleaned more frequently than private locations.

As will be appreciated by those skilled in the art, various devices and approaches can be used to configure the robot with location awareness. For example, the robot could have a map stored therein and track its own movements relative to the map. The robot could be navigated around the facility to acquire the map—called "training." The robot could navigate using markers or the like. As another example, the robot can be configured to track its movements within a wireless cellular network, e.g., using signal strength measuring techniques at access points distributed throughout the locations to be serviced. In short, the present invention is not limited with respect to possible location tracking and navigation approaches.

Figure 8:
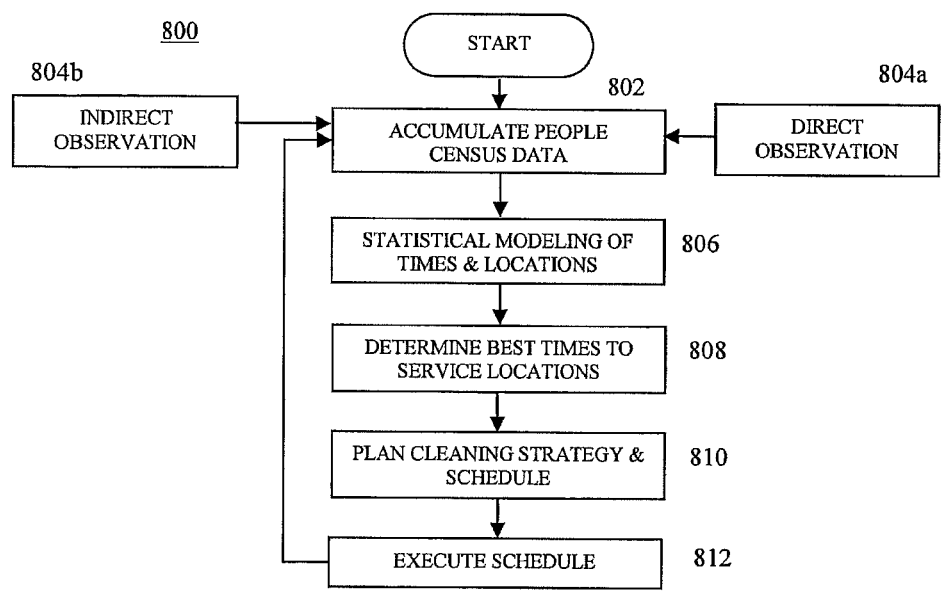
FIGS. 8-11 are flowcharts depicting embodiments of methods for environmental schedule awareness for robots that service an environment.

FIG. 8 is a flowchart 800 of an embodiment of a method for controlling a service robot using people census information. In this embodiment the service robot is a cleaning robot, such as a robotic vacuum.

In step 802 people census data is accumulated, which can happen in at least two ways. In step 804a the robot accumulates people census data through its own observation. For example, the robot can be configured with sensors that can sense the presence of people, e.g., motion detectors, acoustic sensors, cameras, light sensor, and so on, or some combination thereof. The robot can be configured to make observations over time, collecting data over multiple uses. In step 804b observation data is provided to the robot. In other embodiments, the robot could accumulate observation data using a combination of direct observation 804a and indirect observation 804b.

In step 806 statistical modeling can be performed using the accumulated people census data. The modeling can be performed by the robot, or in other embodiments the model can be downloaded to the robot. The model can indicate times and locations of people in the facility and/or areas therein to be serviced. In step 808 a determination of best times for the robot to service various locations is made. In step 810 a service plan or schedule is made based on the determination in step 108. In step 812 the service schedule is executed.

The service schedule can be updated over time based on subsequently collected people census data or other relevant information. In one embodiment, the robot is configured to collect such people census information and to continually or periodically updated the statistical mode and service schedule.

Figure 9:
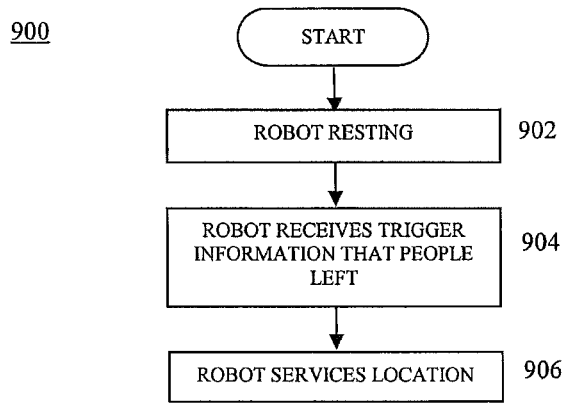

FIG. 9 is a flowchart 900 of another embodiment of a method for controlling a service robot. In this method when people have left the location the robot commences servicing the area.

In step 902 the robot is at rest at a location. In step 904 the robot receives information or data, e.g., a "trigger," that indicates that people have left the location. In step 906 the robot commences servicing the location in response to the trigger. For example, when a room becomes vacated a robotic cleaner can begin to vacuum the room. The trigger could be externally provided or could be the product of one or more sensors included in the robot, or a combination thereof.

Figure 10:
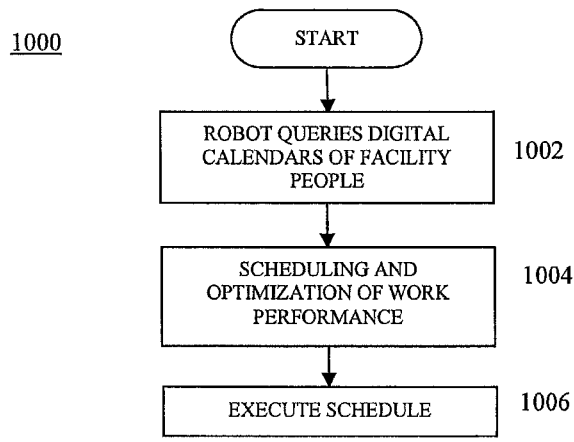

FIG. 10 is a flowchart 1000 of another embodiment of a method for controlling a service robot using digital calendars. In this method the robot creates or tailors a work schedule based on the schedules of people in the facility to be serviced by the robot.

In step 1002 the robot queries digital calendars of facility people, e.g., as in a Microsoft Outlook™ calendar database. This can either be a pull-query or a push query, or a combination thereof. In any case, the scheduling data for people in the facility is accumulated. The scheduling data can also include resource scheduling data. For example, if a room, such as cafeteria, is closed or unscheduled from 2 pm to 5 pm, the information could be included. In step 1004 the robot's work schedule (or plan) is created and/or optimized based on such scheduling data. For example, if a cafeteria is closed from 2 pm to 5 pm the robot could schedule cleaning of that room during that time; if a conference is not booked for an during a particular day, the robot could vacuum that conference room during that time; if a building entrance is closed on weekends the robot could schedule cleaning on the weekend. Additionally, if a group of people working in the same location are scheduled to be at a meeting at a certain time, the robot could schedule cleaning of that location during the time when the people were at the meeting. As another example, if an individual was scheduled to be on vacation for a particular day, the robot could schedule the cleaning of that person's office on that day. In step 1006 the schedule is executed.

Figure 11:
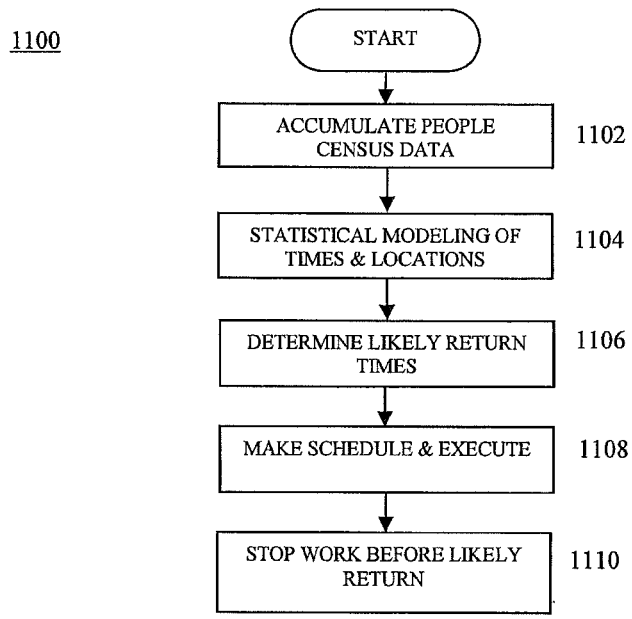

FIG. 11 is a flowchart 1100 of another embodiment of a method for controlling a service robot using people census information. In step 1102 people census data is accumulated, e.g., as described with respect to steps 804a and 804b of FIG. 8. In step 1104 statistical modeling can be performed using the accumulated people census data. The modeling can be performed by the robot, or in other embodiments the model can be downloaded to the robot. The model can indicate times and locations of people in the facility and/or areas therein to be serviced.

In step 1106 likely return times of people can be determined. For example, the model could show that some people leave for lunch at 11:30 am, and it could be predicted that those people will return by 1 pm. In step 1108 a robot service schedule or plan is created and executed by the robot. In step 1110 the robot stops work before the likely return of people, based on the determination in step 1106.

If the robot is interrupted it can stop and wait until the person or people leave. The robot can be configured to resume servicing the location thereafter.

Figure 12:
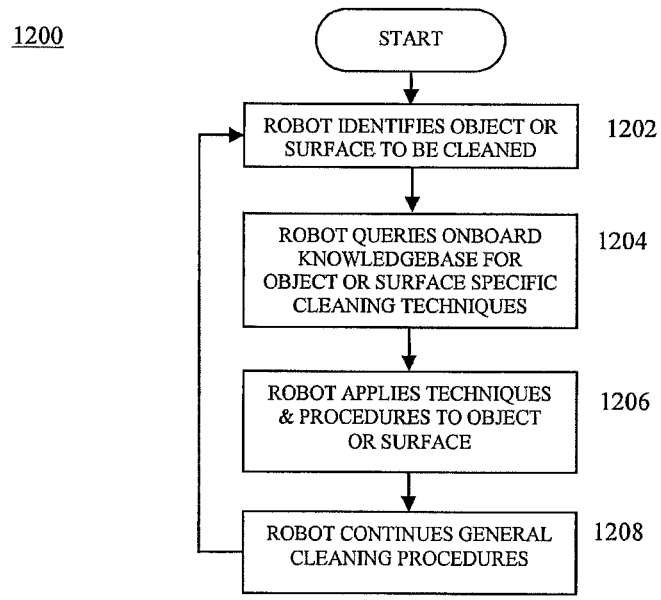
FIGS. 12-15 are flowcharts of embodiments of methods for object, surface, and function-specific service for a service robot.

FIG. 12 is a flowchart 1200 of an embodiment of a method for controlling a service robot using onboard knowledgebase information. In this embodiment the service robot is a cleaning robot, such as a robotic vacuum. In this embodiment, the method presumes that the robot is in the act of cleaning.

In step 1202 the robot identifies an object or surface to be cleaned. For example, an object could be a machine, piece of furniture, or other item. A surface could be glass, hardwood flooring, carpeting, cement, and so on, as just a few examples. In step 1204 the robot queries an onboard knowledgebase, which has information relating to object and/or surface specific cleaning techniques (or procedures) stored therein. Based on the object or surface identified in step 1202, the robot determines the appropriate cleaning technique in step 1204. In step 1206 the robot applies the technique to clean the object or surface. Upon completion, the robot continues cleaning using general cleaning techniques in step 1208, until another object or surface is identified in step 1202.

Figure 13:
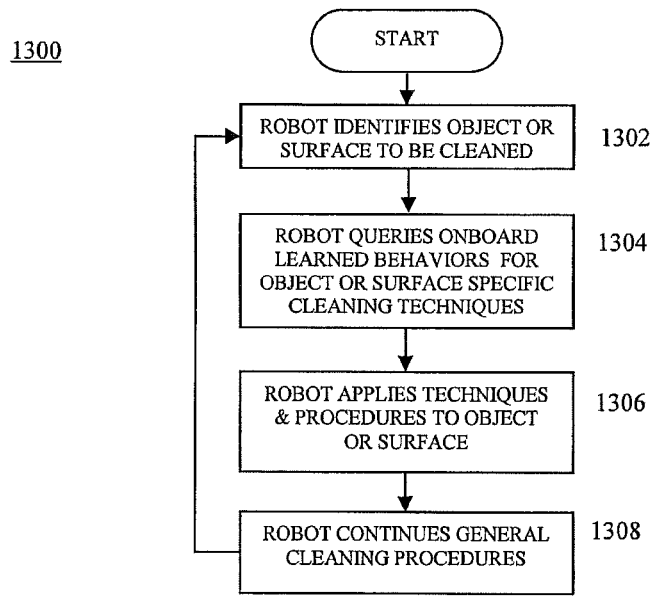

FIG. 13 is a flowchart 1300 of an embodiment of a method for controlling a service robot using onboard library of object and/or surface techniques and procedures. In this embodiment the service robot is a cleaning robot, such as a robotic vacuum. The method presumes that the robot is in the act of cleaning.

In step 1302 the robot identifies an object or surface to be cleaned. In step 1304 the robot queries an onboard library of object and/or surface specific cleaning techniques (or procedures). Based on the object or surface identified in step 1302, the robot chooses the appropriate cleaning technique in step 1304. In step 1306 the robot uses the technique to clean the object or surface. Upon completion, the robot continues cleaning using general cleaning techniques in step 1308, until another object or surface is identified in step 1302.

Figure 14:
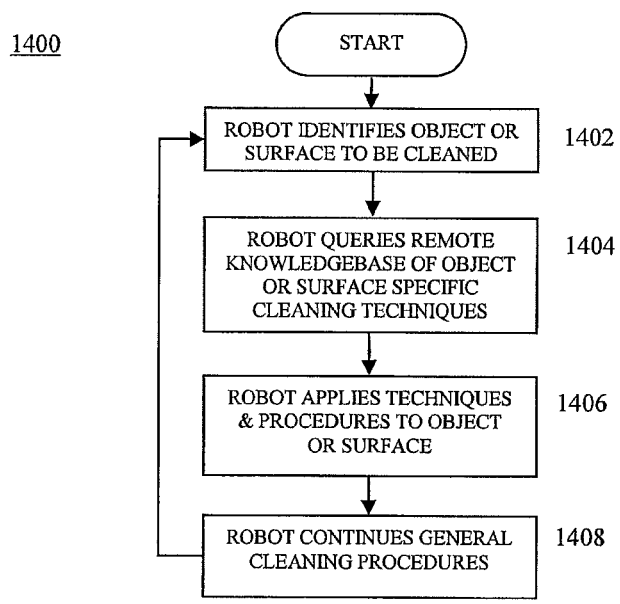

FIG. 14 is a flowchart 300 of an embodiment of a method for controlling a service robot using a remotely accessible knowledgebase information. In this embodiment the service robot is a cleaning robot, such as a robotic vacuum. The method presumes that the robot is in the act of cleaning.

In step 1402 the robot identifies an object or surface to be cleaned. For example, an object could be a machine, piece of furniture, or other item. In step 1404 the robot queries a remote knowledgebase, which has information relating to object and/or surface specific cleaning techniques (or procedures) stored therein. Based on the object or surface identified in step 302, the robot determines the appropriate cleaning technique in step 1404. In step 1406 the robot applies the technique to clean the object or surface. Upon completion, the robot continues cleaning using general cleaning techniques in step 1408, until another object or surface is identified in step 1402.

Figure 15:
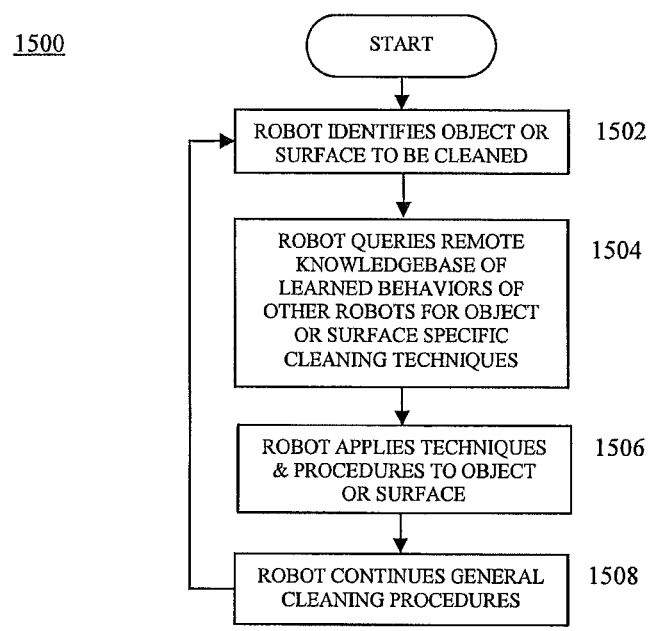

FIG. 15 is a flowchart 1500 of an embodiment of a method for controlling a service robot using a remotely accessible library of object and/or surface techniques and procedures. In this embodiment the service robot is a cleaning robot, such as a robotic vacuum. The method presumes that the robot is in the act of cleaning.

In step 1502 the robot identifies an object or surface to be cleaned. In step 1504 the robot queries the remote library of object and/or surface specific cleaning techniques (or procedures). Based on the object or surface identified in step 1502, the robot chooses the appropriate cleaning technique in step 1504. In step 1506 the robot uses the technique to clean the object or surface. Upon completion, the robot continues cleaning using general cleaning techniques in step 1508, until another object or surface is identified in step 1502.

Those skilled in the art will appreciate that a service robot could implement any combination of the above described methods.

As will be appreciated by those skilled in the art, a service robot (e.g., vacuum) can include a memory for storing instructions and data, and a processor for executing the instructions. Thus, the methods discussed above can be programmed into the service robot for execution to accomplish the functions disclosed herein.

Also, while the service robot was indicated as a robotic cleaner in this embodiment, those skilled in the art will appreciate that methods in accordance with the present invention could be applied to any number of service robots, and could implement any number and types of sensors.

While the foregoing has described what are considered to be the best mode and/or other preferred embodiments, it is understood that various modifications can be made therein and that the invention or inventions may be implemented in various forms and embodiments, and that they may be applied in numerous applications, only some of which have been described herein.

What is claimed is:

1. A method of performing a robotic service, the method comprising:
    navigating a service robot through an environment according to a servicing route to perform a service, using automatic self-control by the robot;
    sensing at least one object in the environment while navigating according to the servicing route;
    collecting data regarding the at least one object in the environment along the service route;
    storing a location of at least one of the at least one object and the service robot determined using the data; and
    based on the data, tailoring the servicing route to enable the service robot to optimally service a plurality of environments.

2. The method of claim 1, further comprising:
    the robot stopping and waiting in response to sensing a living being.

3. The method of claim 1, wherein the sensing is accomplished by a set of sensors including one or more photosensors.

4. The method of claim 1, further comprising:
    the service robot wirelessly communicating with one or more of a control system, database system, other robots, wireless devices, and external sensors.

5. The method of claim 1, further comprising:
    providing a controller, the controller:
        assigning functional labels to each of a plurality of service locations; and
        associating one or more of the service locations with specific events for times of the day to indicate when the servicing should be performed.

6. The method of claim 1, wherein the navigating is performed using one or more electronic maps of the environment stored in a memory.

7. The method of claim 6, further comprising:
    electronically updating the one or more electronic maps using camera data.

8. The method of claim 7, further comprising:
    electronically updating the electronic maps using still image data as sensor data from the camera data.

9. The method of claim 8, further comprising:
    determining and storing location information from the sensor data.

10. The method of claim 7, further comprising:
    electronically updating the electronic maps using video data as sensor data from the camera data.

11. The method of claim 10, further comprising:
    determining and storing location information from the sensor data.

12. A method of performing a robotic service, the method comprising:
    navigating a service robot through an environment according to a servicing route to perform a service, using automatic self-control by the robot;
    sensing at least one object in the environment while navigating according to the servicing route;
    collecting data regarding the at least one object in the environment along the service route;
    storing a location of at least one of the at least one object and the service robot determined using the data; and
    based on the data indicating that a first navigation route conflicts with the at least one object, tailoring the servicing route from the first navigation pattern to a second navigation pattern that avoids contact with the at least one object.

13. The method of claim 12, further comprising:
    electronically storing the second navigation pattern in a storage media for later use.

14. A service robot system comprising:
    a service robot platform;
    a navigation controller and a drive mechanism, the navigation controller configured to navigate the service robot platform through an environment according to a servicing route to perform a service;
    a data collection apparatus configured to collect data regarding at least one object in the environment along the servicing route;
    data storage media configured to store location information of at least one of the at least one object and the service robot platform determined using the data;
    a processor system configured to tailor the servicing route, based on the data, to enable the service robot platform to optimally service the environment.

15. The service robot system of claim 14, wherein the data collection apparatus includes at least one sensor configured to determine the location information of the at least one object relative to the data collection apparatus.

16. The service robot system of claim 14, further comprising:
    a communication module; and
    a control system remote from the service robot platform;
    the communication module configured to communicate with the control system.

17. The service robot system of claim 16, wherein the data storage media is included in the control system.

18. The service robot system of claim 15, wherein at least one of the at least one sensor is positioned on the service robot platform.

19. The service robot system of claim 15, wherein the processor is configured to alter the servicing route based on changes in the location information.

20. The service robot system of claim 15, wherein at least one of the at least one sensor is positioned remote from the service robot platform.

* * * * *

UNITED STATES PATENT AND TRADEMARK OFFICE
CERTIFICATE OF CORRECTION

PATENT NO. : 9,603,499 B2  Page 1 of 1
APPLICATION NO. : 14/487860
DATED : March 28, 2017
INVENTOR(S) : Scott Justin-Marl Friedman et al.

It is certified that error appears in the above-identified patent and that said Letters Patent is hereby corrected as shown below:

In the Specification
Column 9, Line 26 after the word "is" and before the words "no longer", please delete the word "still".

Signed and Sealed this
Thirtieth Day of May, 2017

Michelle K. Lee
*Director of the United States Patent and Trademark Office*